United States Patent
Malenfant et al.

(10) Patent No.: US 7,247,670 B2
(45) Date of Patent: Jul. 24, 2007

(54) NANOTUBES AND METHODS OF DISPERSING AND SEPARATING NANOTUBES

(75) Inventors: Patrick Roland Lucien Malenfant, Clifton Park, NY (US); Walter Vladimir Cicha, Schenectady, NY (US); Pierre-Andre Bui, Clifton Park, NY (US); Davide Louis Simone, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 471 days.

(21) Appl. No.: 10/925,312

(22) Filed: Aug. 24, 2004

(65) Prior Publication Data

US 2006/0045838 A1 Mar. 2, 2006

(51) Int. Cl.
   *C01B 31/02* (2006.01)
(52) U.S. Cl. ............... 524/496; 423/447.1; 423/447.2; 524/495
(58) Field of Classification Search ........... 524/495, 524/496
   See application file for complete search history.

(56) References Cited

U.S. PATENT DOCUMENTS

| | | | |
|---|---|---|---|
| 6,905,667 B1 * | 6/2005 | Chen et al. .............. | 423/447.1 |
| 6,949,206 B2 * | 9/2005 | Whiteford et al. .......... | 252/500 |
| 2002/0048632 A1 | 4/2002 | Smalley et al. | |
| 2002/0068170 A1 | 6/2002 | Smalley et al. | |
| 2002/0136683 A1 | 9/2002 | Smalley et al. | |
| 2004/0202603 A1* | 10/2004 | Fischer et al. ........... | 423/447.2 |
| 2004/0242792 A1 | 12/2004 | Sitzing | |

FOREIGN PATENT DOCUMENTS

| | | |
|---|---|---|
| EP | 1359121 | 11/2003 |
| EP | 1359169 | 11/2003 |

OTHER PUBLICATIONS

Joke J. Apperloo et a.l, "Redox States of Well-Defined π-conjugated Oligothiophenes Functionalized with Poly(benzyl ether) Dendrons", *Journal of the American Chemical Society*, vol. 122, No. 29, (2000) pp. 7042-7051.

Bruce Weisman, "Simplifying Carbon Nanotube Identification", *Technology*, American Institute of Physics, pp. 24-27, Feb./Mar. 2004.

Patrick R. L. Malenfant et al., "Well-Defined Triblock Hybrid Dendrimers Based on Lengthy Oligothiophene Cores and Poly(benzyl ether) Dendrons", *Journal of the American Chemical Society*, vol. 120, (1998) pp. 10990-10991.

Patrick R.L. Malenfant et al., "Dendrimers as Solubilizing Groups for Conducting Polymers: Preparation and Characterization of Polythiophene Functionalized Exclusively with Aliphatic Ether Convergent Dendrons", *Macromolecules*, 33, 3634-3640 (2000).

Joke J. Apperloo et al., "Concentration Dependent Thermochromism and Supramolecular Aggregation in Solution of Triblock Copolymers Based on Lengthy Oligothiophene Cores and Poly(benzyl ether) Dendrons", *Macromolecules*, 33, 7038-7043 (2000).

Patrick R.L. Malenfant et al., "Dendrimer-Supported Oligothiophene Synthesis: Aliphatic Ether Dendrimers in the Preparation of Oligothiophenes with Minimal Substitution", *Chem. Mater.*, 11, 3420-3422, (1999).

* cited by examiner

*Primary Examiner*—Katarzyna Wyrozebski
(74) *Attorney, Agent, or Firm*—Shawn A. McClintic; William E. Powell, III (57) ABSTRACT

A nanostructure having at least one nanotube and at least one chemical moiety non-covalently attached to the at least one nanotube. At least one dendrimer is bonded to the chemical moiety. The chemical moiety may include soluble polymers, soluble oligomers, and combinations thereof. A method of dispersing at least one nanotube is also described. The method includes providing at least one nanotube and at least one chemical moiety to a solvent; debundling the nanotube; and non-covalently attaching a chemical moiety to the nanotube, wherein the non-covalently attached chemical moiety disperses the nanotube. A method of separating at least one semi-conducting carbon nanotube is also described.

72 Claims, 9 Drawing Sheets

Fig. 1C(III)

Fig. 1C(VII)

Fig. 1C(VIII)

NANOTUBES AND METHODS OF DISPERSING AND SEPARATING NANOTUBES

BACKGROUND OF THE INVENTION

The present invention relates to nanotubes attached to a variety of chemical moieties in various solvents. More specifically, the invention relates to carbon single-walled nanotubes (SWNTs) attached to soluble polymers or soluble oligomers in a variety of solvents.

In their pristine state, carbon single-walled nanotubes (SWNTs) exist as randomly bundled tubes with varying chirality, diameter, and properties, such as metallic, semi-metallic, and semi-conducting electronic behaviors.

Although a variety of methods are known for dispersing SWNTs, existing methods suffer from various disadvantages. For example, although debundling nanotubes may increase solubility of SWNTs in common solvents, one disadvantage is that current methods attain only limited solubility. Another disadvantage is that covalent and ionic functionalization of SWNTs can be detrimental to the SWNTs' unique and desirable properties, specifically, the SWNTs' electronic behavior. Furthermore, some existing methods limit the orientation in which a chemical moiety may attach to a nanotube Another disadvantage of existing methods of dispersing SWNTs by attachment of a chemical moiety is the limited ability to selectively disperse semi-conducting (sc) SWNTs and, optionally, separate semi-conducting (sc) nanotubes from metallic (met) carbon nanotubes.

Consequently, what is needed is a method that permits a chemical moiety to attach to a carbon nanotube non-covalently. What is also needed is a method for dispersing carbon nanotubes in a range of suitable solvents. What is further needed is a method for dispersing and separating semi-conducting (sc) carbon nanotubes from metallic (met) SWNTs.

BRIEF SUMMARY OF THE INVENTION

The present invention meets these and other needs by providing a nanostructure comprising at least one nanotube and at least one chemical moiety such as a soluble polymer or soluble oligomer.

Accordingly, one aspect of the invention is to provide a nanostructure. The nanostructure comprises at least one nanotube and at least one chemical moiety non-covalently attached to the at least one nanotube. The at least one chemical moiety comprises at least one of a soluble polymer, soluble oligomer, and combinations thereof. At least one dendrimer is bonded to the at least chemical moiety.

A second aspect of the invention is to provide a method of dispersing at least one nanotube. The method comprises: providing at least one nanotube and at least one chemical moiety to a solvent; debundling the at least one nanotube; and non-covalently attaching the at least one chemical moiety to the at least one nanotube, wherein the at least one non-covalently attached chemical moiety disperses the at least one nanotube. At least one dendrimer is bonded to the at least chemical moiety.

A third aspect of the invention is to provide a nanostructure. The nanostructure comprises at least one semi-conducting carbon nanotube and at least one conjugated soluble polymer non-covalently attached to the at least one semi-conducting carbon nanotube. At least one dendrimer is bonded to the at least one conjugated soluble polymer. The at least one conjugated polymer comprises at least one of a polythiophene, a polyfluorene, and combinations thereof.

A fourth aspect of the invention is to provide a method of selectively separating at least one semi-conducting carbon nanotube. The method comprises: providing a plurality of carbon nanotubes and at least one conjugated soluble polymer to a solvent, wherein at least a portion of the carbon nanotubes is semi-conducting; debundling at least a portion of the plurality of carbon nanotubes; non-covalently attaching the at least one conjugated soluble polymer to at least one semi-conducting carbon nanotube, wherein the at least one non-covalently attached conjugated soluble polymer disperses the at least one semi-conducting carbon nanotube; and separating the at least one semi-conducting carbon nanotube non-covalently attached to the at least one conjugated soluble polymer.

These and other aspects, advantages, and salient features of the present invention will become apparent from the following detailed description, the accompanying drawings, and the appended claims.

DETAILED DESCRIPTION

In the following description, like reference characters designate like or corresponding parts throughout the several views shown in the figures. It is also understood that terms such as "top," "bottom," "outward," "inward," and the like are words of convenience and are not to be construed as limiting terms.

Referring to the drawings in general, it will be understood that the illustrations are for the purpose of describing a particular embodiment of the invention and are not intended to limit the invention thereto.

Figure 1A:
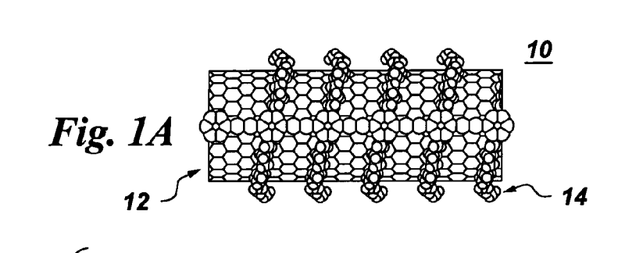
FIG. 1A is a schematic representation of a nanostructure of the present invention.
Figure 1B:
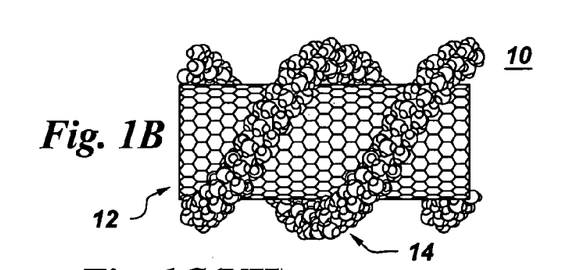
FIG. 1B is a schematic representation of another nanostructure of the present invention.
Figure 1C:
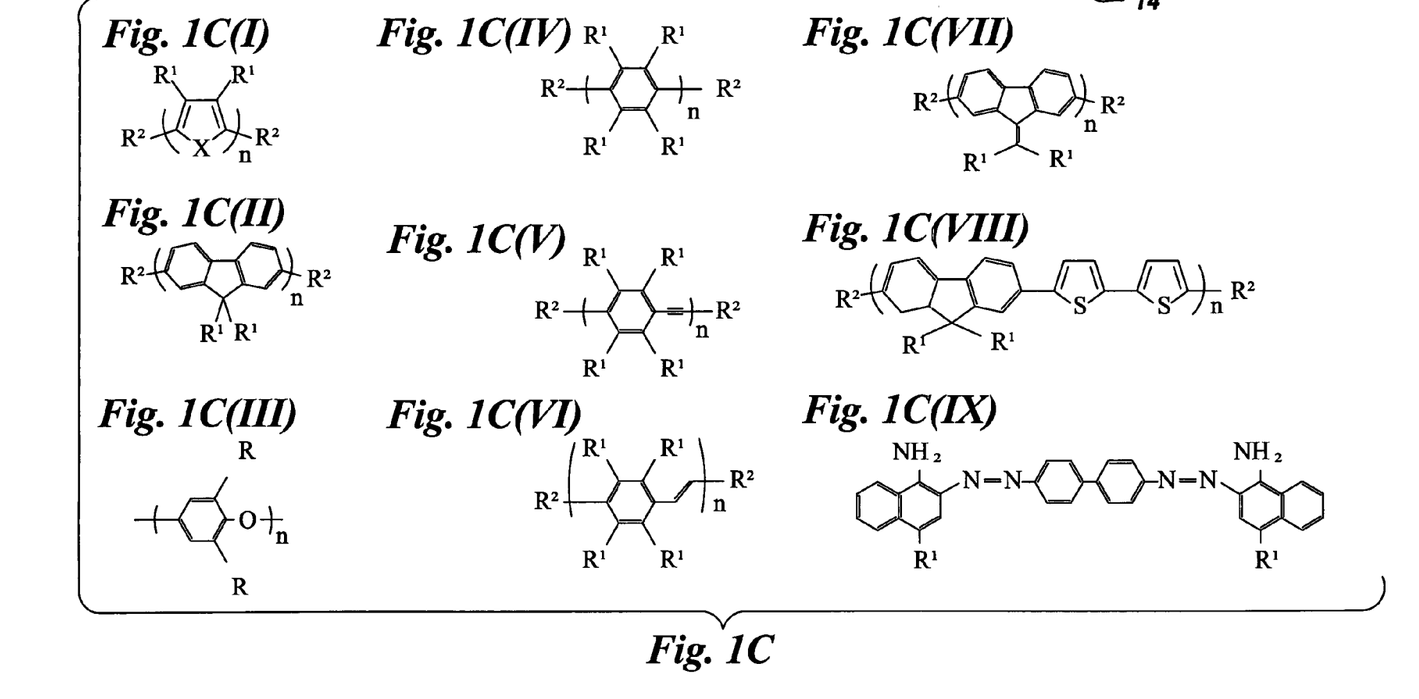
FIG. 1C are structures of chemical moieties that can non-covalently attached to a nanotube.

Schematic representations of two nanostructures of the present invention are shown in FIGS. 1A and 1B. The nanostructure 10 comprises at least one nanotube 12 and at least one chemical moiety 14. The chemical moiety 14 is non-covalently attached to the at least one nanotube. The chemical moiety 14 comprises at least one of a soluble polymer, a soluble oligomer, and combinations thereof. The chemical moiety may individually comprise any such polymer, oligomer, or any combination thereof.

In one embodiment, the at least one nanotube 12 comprises a carbon nanotube. When more than one carbon nanotube is present, the plurality of carbon nanotubes may have various characteristics. For example, the carbon nanotubes may include single-walled carbon nanotubes, multi-walled carbon nanotubes, or combinations or mixtures thereof. The carbon nanotubes may also comprise metallic carbon nanotubes, semi-metallic carbon nanotubes, semi-conducting carbon nanotubes, or combinations or mixtures thereof. In one particular embodiment, the at least one nanotube comprises at least one semi-conducting carbon nanotube.

The at least one chemical moiety 14 is non-covalently attached to the at least one nanotube 12. Examples of such modes of non-covalent attachment include, but are not limited to, ionic interactions such as interactions between oppositely charged species, Van der Waals forces, π-π orbital interactions, and hydrogen bonding.

FIGS. 1A and 1B are schematic representations of the at least one chemical moiety 14 non-covalently attached to a nanotube 12. The chemical moiety 14 can be attached to the nanotube 12 in various orientations such as, but not limited to, a non-wrapping orientation along the length of the nanotube as seen in FIG. 1A or wrapping around the nanotube 12, as seen in FIG. 1B. Furthermore, the chemical moiety 14 may be non-covalently attached to the nanotube 12 at a plurality of sites on the nanotube 12. The mode of attachment may differ from site to site where the chemical moiety 14 attaches to the nanotube 12. Also, a plurality of chemical moieties 14 may be non-covalently attached to the nanotube 12. Each of the chemical moieties may attach to the nanotube 12 by a different mode of attachment.

At least one dendrimer is bonded to the at least one chemical moiety 14. Examples of such dendrimers that may bond to the chemical moiety 14 include, but are not limited to, aliphatic ethers, aliphatic esters, aliphatic amines, aliphatic amides, aromatic ethers, aromatic esters, aromatic amines, aromatic amides, aromatic alkynes, phenylenes, aromatic alkenes, and polyether carbamates.

Non-limiting examples of soluble polymer and soluble oligomer structures are shown in FIG. 1C (I)-(VIII) and FIG. 1C (IX). For structures shown in FIG. 1C (I)-(VIII), R is independently, at each occurrence, a methyl group, an ethyl group, or a phenyl group. $R^1$ is independently, at each occurrence, a H, an alkyl group, an alkoxy group, a linear polymer, or a dendrimer. For a given unit of n, at least one $R^1$ is an alkyl group with more than three carbons, an alkoxy group with more than three carbons, or a dendrimer. $R^2$ independently, at each occurrence, is a H, a halogen, a dendrimer, a linear polymer, an alkyl group, or an alkoxy group. X independently, at each occurrence, is S or N—$R^3$. $R^3$ independently, at each occurrence, is a H, an alkyl, a linear polymer, or a dendrimer; and n is independently an integer in a range from 1 to about 500. Linear polymer or copolymers include, but are not limited to, polyethyleneglycol, polypropyleneglycol, poly(acrylates), poly(methacylates), poly(acrylamides), poly(methacrylamides), poly(acrylonitrile), poly(lactide), poly(styrene), poly(butadiene), poly(isoprene), polyphenylene oxide, polycarbonate, polyimide, silicone, and polyesters (aromatic and aliphatic).

When any variable occurs more than one time in any constituent, its definition on each occurrence is independent of its definition at every other occurrence. Also, combinations of substituents and variables are permissible only if such combinations result in stable compounds.

In one embodiment of the nanostructure 10, the at least one chemical moiety 14 comprises a soluble polymer. In one non-limiting example, the soluble polymer includes a conjugated soluble polymer. Examples of such conjugated soluble polymers include, but are not limited, polythiophenes, polypyrroles, polyfluorenes, polyphenylenes, polyphenylene ethynylenes, polyphenylene vinylenes, poly(alkylidene fluorenes), poly(fluorenebithiophenes), and combinations thereof. The nanostructure may comprise any of the aforementioned conjugated soluble polymers individually attached to the nanotube 12 or any combination thereof. In one embodiment, a plurality of the conjugated soluble polymers non-covalently attach to a nanotube 12 while, in another embodiment, a single conjugated soluble polymer non-covalently attaches to a nanotube 12.

In a particular embodiment, the conjugated soluble polymer is a polythiophene, as shown in FIG. 1C (I), wherein X is sulfur. In one non-limiting example, the polyfluorene may have a carbon chain in a range from $C_4$ to $C_{18}$. The following are three other non-limiting examples of a polythiophene.

The first example of a polythiophene is:

wherein $R^2$ is the dendrimer:

A second example of a polythiophene is wherein $R^2$ is the dendrimer:

The third example of a polythiophene is:

poly-3-hexyl-thiophene, wherein $R^1$ is an hexyl and $R^2$ is H or halogen.

In another embodiment, the conjugated soluble polymer comprises a polyfluorene such as in FIG. 1C (II):

A non-limiting example of a polyfluorene is dihexylpolyfluorene (DHPF) wherein $R^1$ is $C_6H_{13}$ and $R^2$ is H or a halogen.

In another embodiment of the nanostructure 10, the chemical moiety 14 comprises a soluble oligomer non-covalently attached to the at least one nanotube 12. In one non-limiting example, the soluble oligomer includes a conjugated soluble oligomer. Examples of conjugated soluble oligomer include azo dyes, as shown in FIG. 1C (IX). Azo dyes may include mono azo dyes as well as diazo dyes. In one particular example, the azo dye comprises Congo Red, wherein $R^1=SO_3R^2$ and $R^2=Na$. Congo Red is also known as 3,3'-[[1,1'-Biphenyl]-4,4'-diylbis(azo)]-bis[4-amino-1-naphtalenesulfonic acid]disodium salt.

Other examples of azo dyes include Mordant Orange 6, Mordant Orange 1, Mordant Yellow 7, Plasmocorinth B, Mordant Black 17, and Mordant Blue 9. Mordant Orange 6 is known as Benzoic acid, 2-hydroxy-5-[[4-[(4-sulfophenyl)azo]phenyl]azo]-, disodium salt. Mordant Orange 1 is known as 5-(4-nitrophenylazo)salicylic acid] or the salt of the acid. Mordant Yellow 7 is known as 3-Methyl-5-(4-sulfophenylazo)salicylic acid, disodium salt. Plasmocorinth B is known as 2,7-Naphthalenedisulfonic acid, 3-[(5-chloro-2-hydroxyphenyl)azo]-4,5-dihydroxy-, disodium salt. Mordant Black 17 is known as 1-Naphthalenesufonic acid, 3-hydroxy-4-[(2-hydroxy-1naphthalenyl0azo]-, monosodium salt. Mordant Blue 9 is known as 6-(5-chloro-2-hydroxy-3-sulfophenyl-azo)-5-hydroxy-1naphthalene-sulfonic acid, disodium salt.

Examples of conjugated soluble oligomers include other dyes besides azo dyes, such as polymethine quinoline. An example of polymethine quinoline is Pinacyanol chloride. Pinacyanol chloride is known as Quinolinium 1-ethyl-2-[3-(1-ethyl-2(1H)-quinolinylidene)-1-propenyl]-, chloride.

In one embodiment, the electrical, mechanical, or thermal properties of the at least one nanotube non-covalently attached to the soluble polymer are substantially the same as those of the nanotube prior to being non-covalently attached to the soluble polymer. For example, the electrical conductivity of semi-conducting SWNTs remains unchanged after attachment of the chemical moiety 14.

Figure 2:
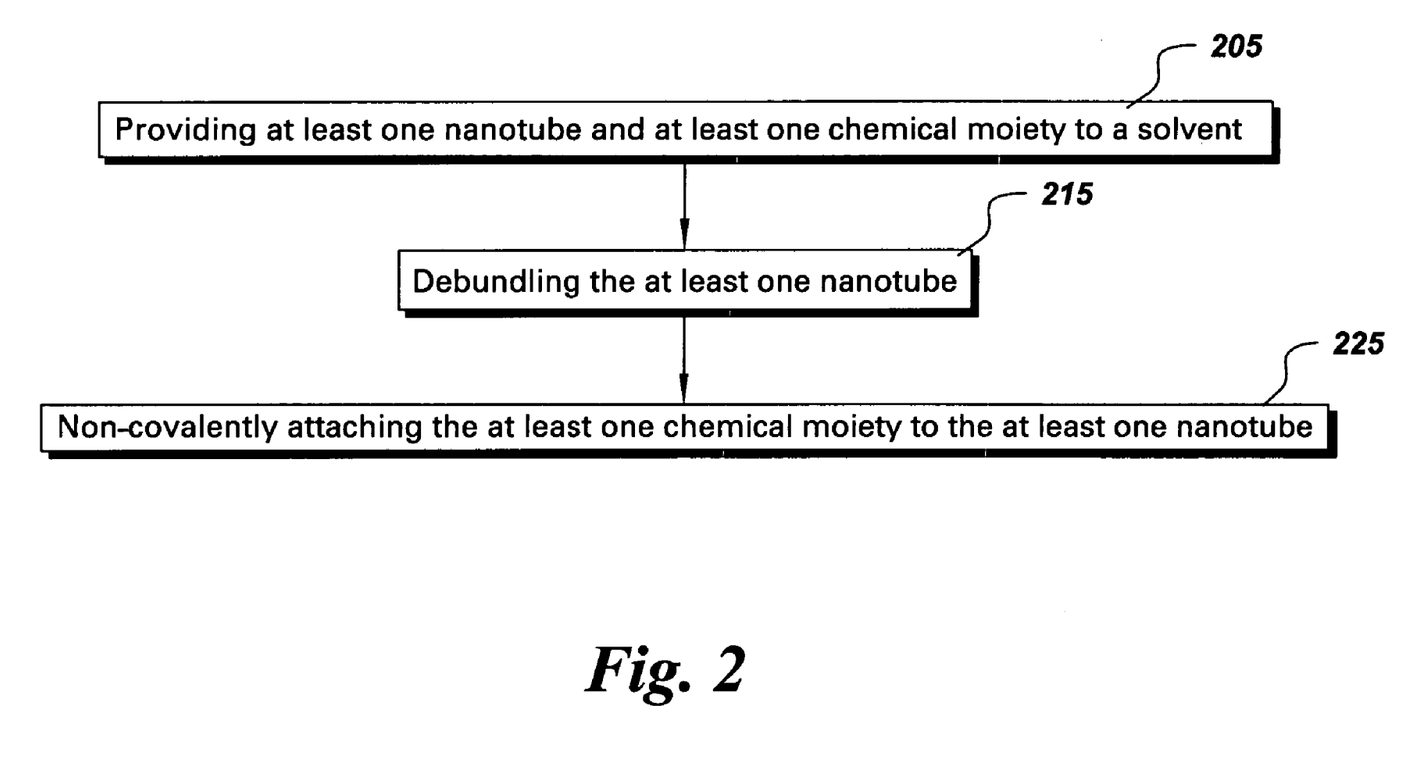
FIG. 2 is a flow diagram showing a method of dispersing at least one nanotube.

The invention also encompasses a method of dispersing at least one nanotube. FIG. 2 is a flow diagram of the method. Referring to FIG. 2, step 205 comprises providing at least one nanotube and at least one chemical moiety to a solvent. Examples of suitable solvents include polar, non-polar, and organic solvents. Examples of suitable solvents include chloroform, dichlorobenzene, water, triethylamine, pyridine, isopropyl alcohol, ethanol, methanol, N-methyl pyrrolidinone, dimethylformamide, acetonitrile, toluene, and tetrahydrofuran. Any of the aforementioned solvents may be used individually or in combination with each other, providing that they are miscible.

In step 215, the at least one nanotube is debundled. Debundling includes at least partially separating aggregated or agglomerated nanotubes. One way to debundle the nanotubes is to introduce a plurality of CNTs into a liquid and sonicate the mixture.

The method is not limited by a sequence of when the chemical moiety and nanotube are provided. The chemical moiety and nanotube can be either sequentially or simultaneously added to the solvent. The method is also not limited by the sequence of when the nanotubes are debundled and when the chemical moiety is provided. The nanotubes can be debundled before, during, or after the chemical moiety is provided. In fact, the nanotubes can be debundled during the addition of the chemical moiety as a result of the actions of the chemical moiety.

In step 225, the at least one chemical moiety is non-covalently attached to at least one nanotube. In step 225, also referred herein as Step 1, a chemical moiety 14 is typically attached to a nanotube 12 as follows: In vial 1, 0.1-1 mg/ml purified high pressure carbon monoxide (HiPCO) SWNTs are partially dispersed in a solvent. Typically, SWNT having 2 wt % metal content grade are used; however, SWNTs having other metal content grades may also be used. Most typically, the solvent used is $CHCl_3$, although any of the aforementioned solvents may be used instead, either individually or in combination with each other. The purified HiPCO SWNTs are dispersed in the solvent by sonicating in a water bath. The purified HiPCO SWNTs are sonicated for 5-30 minutes. Typically, sonication is conducted for about 15 minutes. In vial 2, containing the same solvent as vial 1, at least one soluble polymer is dissolved, typically by sonication in a water bath. The weight of the polymer used is such that the resulting polymer:SWNT ratio is in a range from 0.1:1 to 20:1 by weight. Most typically, the polymer:SWNT ratio is 1:1. The contents of vial 2 are added to vial 1 and the mixture is sonicated for 15 to 180 minutes. Typically, the mixture is sonicated for about 30 minutes.

The resulting mixture of nanotubes can optionally be separated based on different characteristics of the nanotubes, such as semi-conducting nanotubes, metallic nanotubes, and the like. Ways of separating include centrifugation, filtration, magnetic field induced separation, chromatography, electrophoresis, and combinations thereof. As an example, the resulting mixture of nanotubes, which are either partially or wholly non-covalently attached to at least one soluble polymer, can then be optionally centrifuged, in Step 2, and filtered, in Step 3, both of which are described below. The optional step of centrifugation (Step 2) separates, in part or whole, the nanotubes that are non-covalently attached to the polymer from those nanotubes that are not attached to a polymer.

The mixture obtained in Step 1 is centrifuged (Step 2) for 2-15 minutes. Typically, the mixture is centrifuged for about 5 minutes. Centrifugation is at 1000 to 5000 rpm, most typically at 3500 rpm. The precipitate is separated from the elutant and the elutant is either filtered according to Step 3 below or directly submitted for characterization. The precipitate is characterized as is or dissolved in a solvent, most typically $CHCl_3$, and then characterized or treated with additional soluble polymer dissolved in $CHCl_3$ before repeating the entire centrifugation procedure on the resulting solution.

The optional step of filtration (Step 3) removes excess polymer which is not attached to SWNTs, thus allowing the polymer:SWNT stoichiometry to be determined. Solutions obtained directly from Step 1 or after processing according to Step 2 are filtered. Typically, the solutions are filtered through a 4-4.5 micron sintered glass filter and then washed repeatedly with a solvent. The SWNTs attached to a polymer that are isolated by filtration in this manner are either characterized as is or redissolved in a solvent via water bath sonication (5-60 minutes, most typically 30 minutes), and then characterized. SWNT characterization can include visual inspection, microscopic techniques such as atomic force microscopy (AFM), transmission electron microscopy (TEM), or scanning electron microscopy (SEM), and spectroscopic analysis such as UV/VIS/NIR absorption spectroscopy or Raman spectroscopy.

The following examples serve to illustrate the features and advantages of the present invention and are not intended to limit the invention thereto.

EXAMPLE 1

Example 1 describes the preparation of a nanostructure in which poly-3-hexyl-thiophene (P3HT) is non-covalently attached to at least one single wall carbon nanotube.

Solution 1 was prepared by adding 7.5 ml of $CHCl_3$ to 14.9 mg SWNT and sonicating the resulting mixture in a water bath for 15 minutes. Solution 2 was prepared by adding an identical volume of $CHCl_3$ as in solution 1 to 7.1 mg of P3HT and sonicating for 5 minutes, until complete dissolution occurred and a deep orange colored solution resulted. Solution 2 was added to solution 1, and the resulting solution 3 was sonicated for 20 minutes. An opaque, dark brown solution resulted.

Solution 3 was centrifuged for 10 minutes at 3000 rpm. The supernatant was carefully decanted from the fraction of precipitated SWNTs remaining at the bottom of the centrifuge tube. A portion of the removed supernatant was filtered through a 4-4.5 micron sintered glass filter and repeatedly washed with $CHCl_3$ to remove any excess P3HT. The stoichiometric P3HT:SWNT ratio was determined to be 0.45+/−0.02. The resulting solution contained well-dispersed SWNTs.

EXAMPLE 2

Example 2 describes the synthesis of a nanostructure comprising a conjugated soluble polymer, dihexylpolyfluorene (DHPF), wherein $R^1$ is $C_6H_{13}$ and $R^2$ is H or a halogen, non-covalently attached to at least one carbon nanotube, and subsequent characterization.

Solution 1 was prepared by adding 10.0 ml of $CHCl_3$ to 10.0 mg SWNT, followed by sonication in a water bath for 30 minutes. Solution 2 was prepared by adding an identical volume of $CHCl_3$ as in solution 1 to 12.4 mg of DHPF and sonicating for 1 minute, until complete dissolution occurred and a light yellow colored solution resulted. Solution 2 was added to solution 1 to form solution 3, which was then sonicated for 45 minutes. An opaque, dark blue solution resulted.

Solution 3 was then centrifuged for 5 minutes at 3500 rpm. The supernatant was carefully decanted from the fraction of precipitated SWNTs remaining at the bottom of the centrifuge tube. A portion of the removed supernatant was filtered through a 4-4.5 micron sintered glass filter and repeatedly washed with $CHCl_3$ to remove any excess DHPF. The stoichiometric DHPF:SWNT ratio was estimated to be 0.4+/−0.1. The resulting solution contained well dispersed SWNTs.

Atomic force microscopy (AFM) was used to statistically analyze and compare the diameter distribution of SWNTs that are non-covalently attached to the conjugated soluble polymers P3HT and DHPF with those of untreated SWNTs (i.e., SWNTs having no polymer attached). Table I summarizes the diameter distribution of polymer-treated SWNTs compared to that of untreated SWNTs (no attachment) as measured by AFM. The percentages listed in Table I represent the fraction of SWNTs within each diameter distribution range. The samples were solvent-cast from $CHCl_3$, unless otherwise indicated. The data were divided into two subsets: non-covalently functionalized (i.e., those having P3HT or DHPF attached) tubes with diameters<5 nm (debundled) and those with diameters>5 nm (bundled). The original polymer:SWNT ratio was 1:1 by weight in each case. The data is a compilation of 100 random measurements at two different AFM magnifications.

TABLE I

| | P3HT-SWNT | DHPF-SWNT | UNTREATED SWNT (in $CHCl_3$) | UNTREATED SWNT (in THF) |
|---|---|---|---|---|
| Ave. tube diameter (nm) | 2.9 (1.1) | 3.5 (0.8) | 0.70 (0.35) | NA |
| % of tubes having diameter <5 nm (%) | 62 | 46 | 10 | 0 |
| Ave. tube diameter (nm) | 7.1 (1.6) | 8.7 (4.4) | 22 (11) | 12 (4) |
| % of tubes having diameter <5 nm (%) | 38 | 54 | 90 | 100 |

[SWNT] = 0.5-1 mg/ml in original dispersions

The data in Table I demonstrate that soluble polymers such as P3HT and DHPF disperse SWNTs in $CHCl_3$, leading to average individual polymer-SWNT diameters slightly in excess of 3 nm. The degree of dispersion seems to be greater for P3HT than for DHPF because P3HT treated SWNTs have a greater percentage of SWNTs with diameters less than 5 nm. This greater percentage of diameters that are less than 5 nm is indicative of more tube debundling. As would be expected, untreated or attached SWNTs, whether solvent-cast from $CHCl_3$ or from THF, contain a significantly higher percentage of tubes with diameters above 5 nm, and thus the greatest degree of bundling or, conversely, the lowest level of dispersion.

Figure 3:
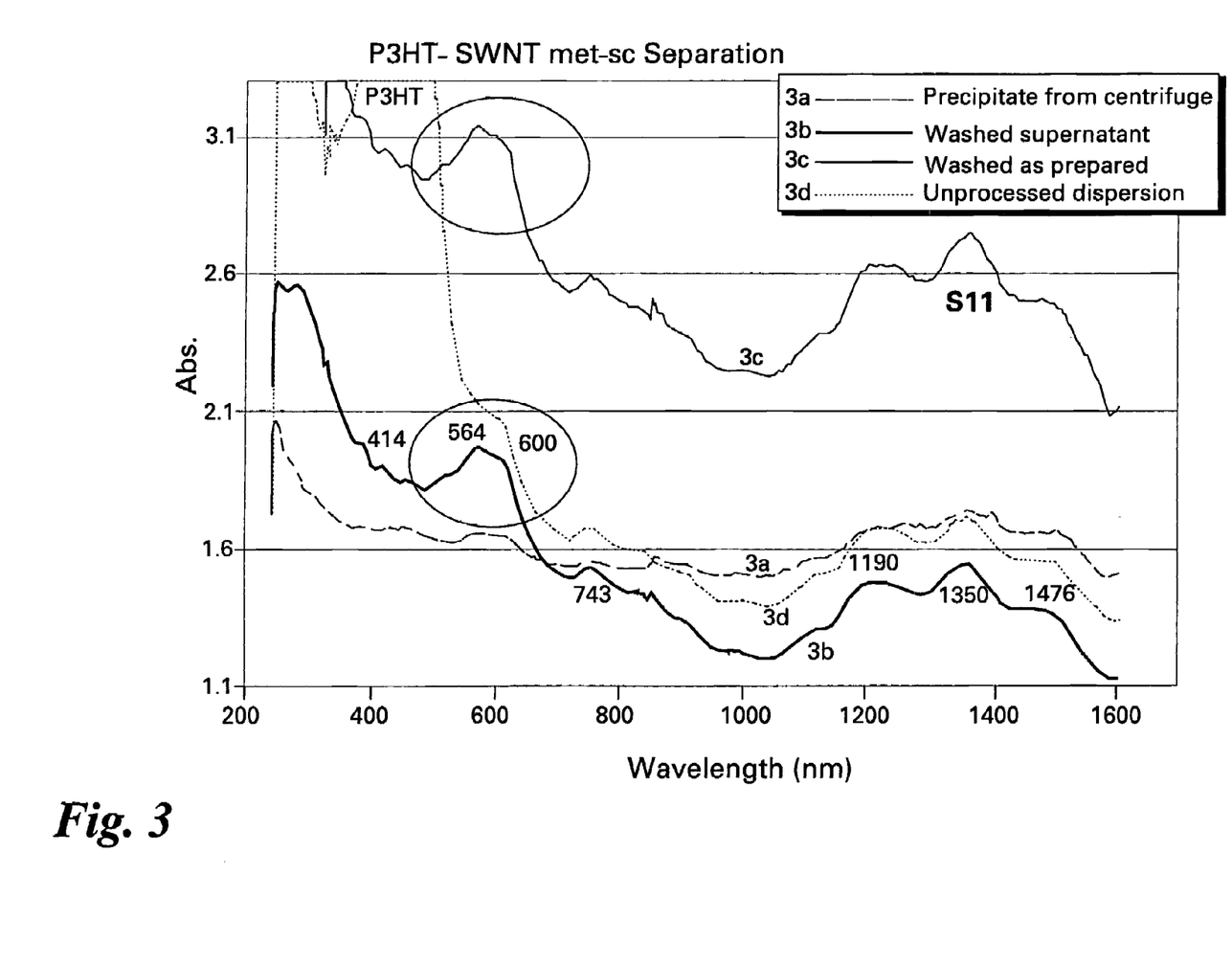
FIG. 3 is an UV/VIS/NIR absorption spectrum showing the attachment of the polymer P3HT with SWNTs.
Figure 4:
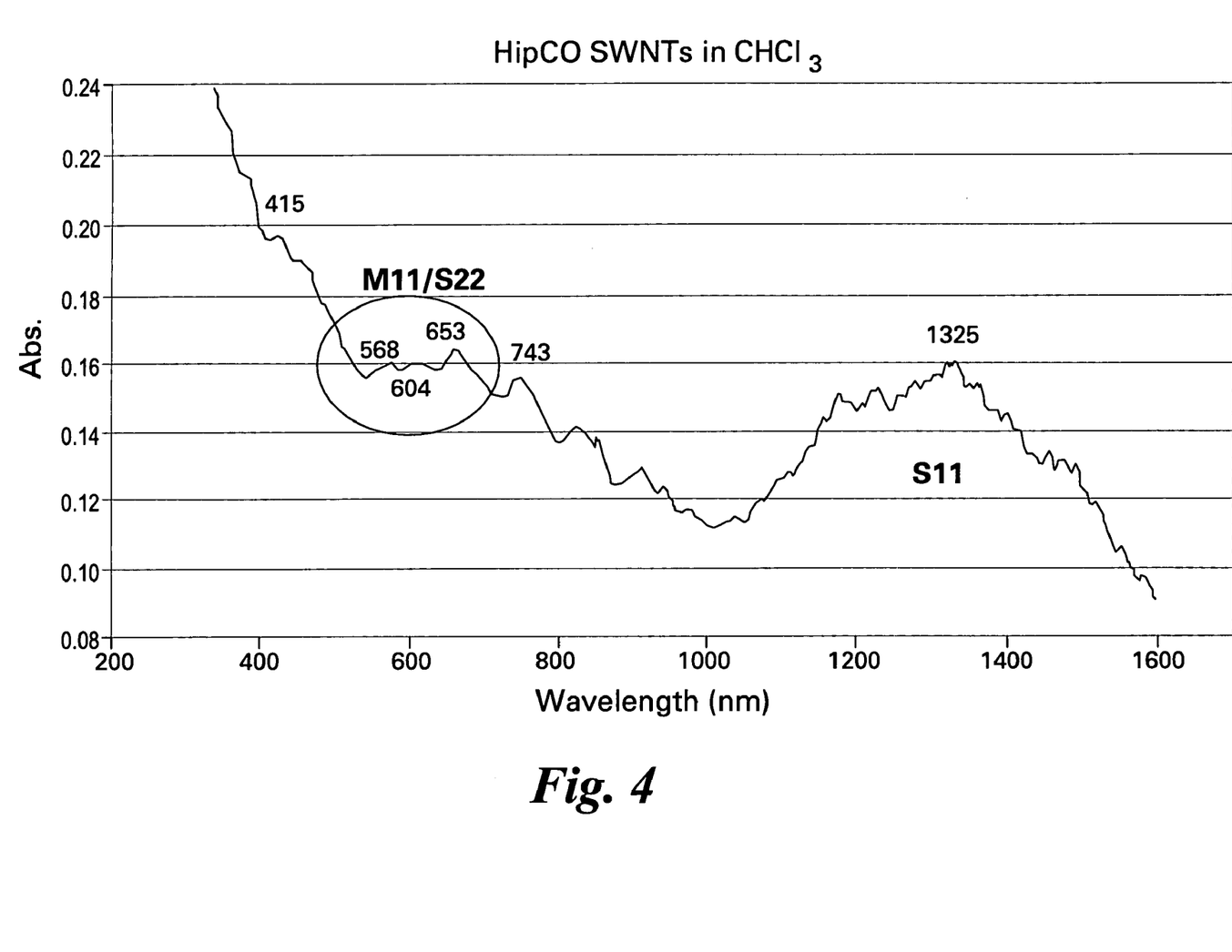
FIG. 4 is an UV/VIS/NIR absorption spectrum of pristine or untreated SWNTs in $CHCl_3$.

In one particular embodiment, carbon nanotubes are dispersed by attaching at least one conjugated soluble polymer such as a polythiophene, a polyfluorene, or combinations thereof to the nanotube. In a particular embodiment, the conjugated soluble polymer is P3HT. The enhanced solubilization of some SWNTs by non-covalently attaching P3HT to SWNTs is shown by the UV/VIS/NIR absorption spectra in FIG. 3. The UV/VIS/NIR absorption spectra in FIG. 3 shows that P3HT has an affinity for the SWNTs, as evidenced by the 550-650 nm range (circled area FIG. 3). For comparative purposes, an UV/VIS/NIR absorption spectrum of untreated SWNTs is shown in FIG. 4.

Figure 5:
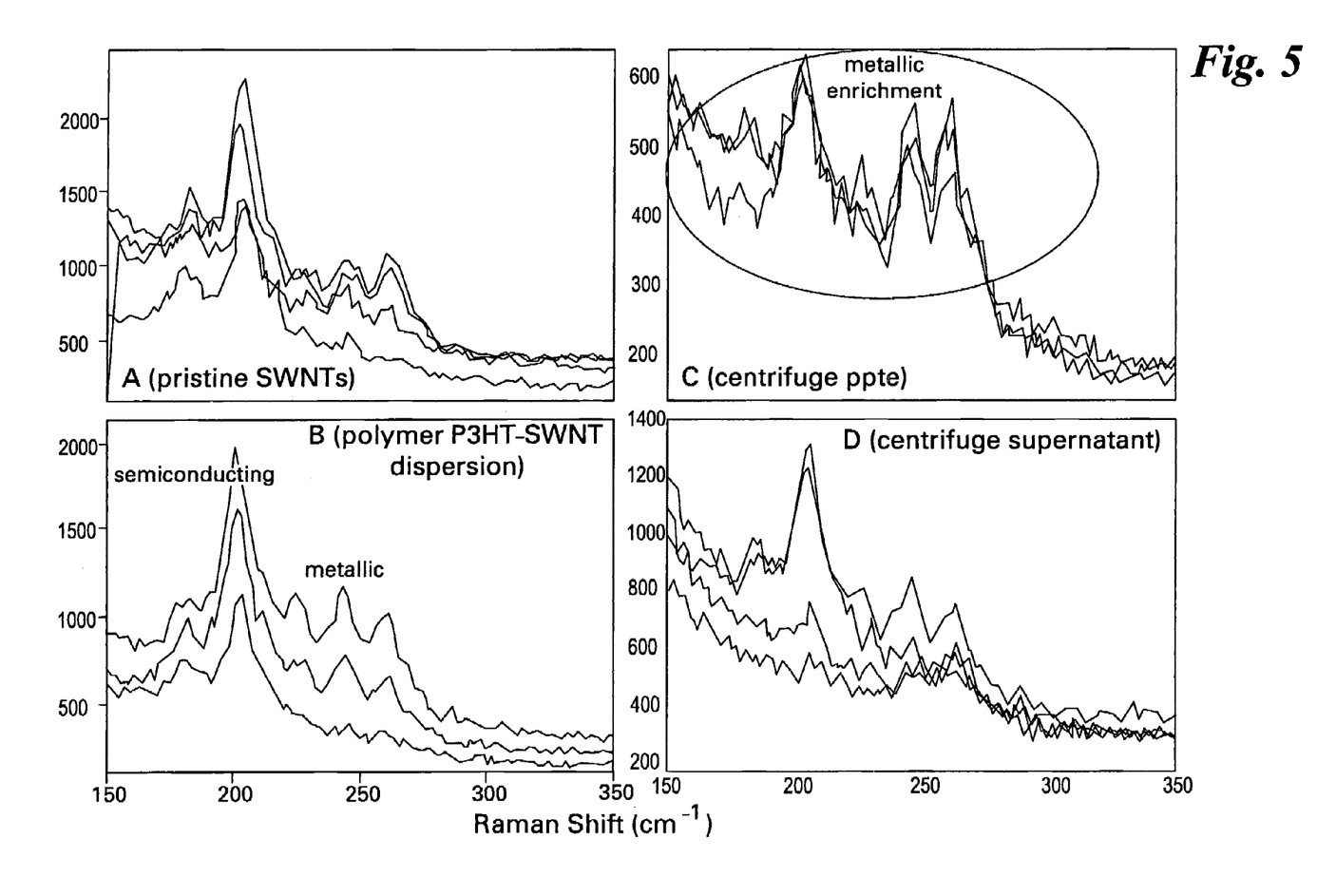
FIG. 5 is a 514 nm Raman spectra of SWNTs solvent-cast onto quartz from $CHCl_3$.

Evidence for the selective solubilization of semi-conducting SWNTs was obtained from Raman studies using a 514 nm laser light source, as shown in FIG. 5. The relative intensities of the bands in spectrum C ("post-centrifuge precipitate" in FIG. 5) are significantly different from the intensities in the other three spectra shown in FIG. 5. This comparison suggests that P3HT partially separates SWNTs into sc-enriched (supernatant) and met-enriched (precipitate) portions.

Table II is a summary and interpretation of the radial breathing mode (RBM) region of the 514 nm Raman data obtained for soluble P3HT-SWNT dispersions solvent-cast onto quartz wafers from $CHCl_3$ solutions. The spectrum obtained for pristine, or untreated (i.e., no moiety has been attached), SWNTs indicates the presence of both semi-conducting (sc) and metallic (met) SWNTs, with the intensities of the peaks of both the sc-SWNTs and met-SWNTs being relatively strong. In the spectra obtained for both the P3HT-SWNT dispersion and the supernatant ('supernatant' in Table II), the met-SWNT peaks have decreased relative to the intensity of the sc-SWNT peaks, indicating that both the supernatant and dispersion are enriched in sc-SWNTs as a result of the selective functionalization and dispersion of the sc-SWNTs. In the spectrum obtained for the precipitate, the situation is reversed, as the met-SWNT peaks are relatively stronger than the sc-SWNT peaks. This indicates that the precipitate is enriched with met-SWNTs and, conversely, that the sc-SWNT concentration in the precipitate is depleted.

TABLE II

| RBM band position (+/−2 cm$^{-1}$) | SWNT diameter (+/−0.03 nm) | Pristine SWNTs intensity | P3HT-SWNT dispersion intensity | Precipitate intensity | Supernatant intensity | Assignment |
|---|---|---|---|---|---|---|
| 183 | 1.32 | m | w | w | w | sc |
| 203 | 1.18 | s | s | m-s | s | sc |
| 227 | 1.05 | w | w-m | w | w | met |
| 246 | 0.96 | m | w-m | s | w-m | met |
| 261 | 0.90 | m | w-m | s | w-m | met | w = weak;
m = medium;
s = strong

Figure 6:
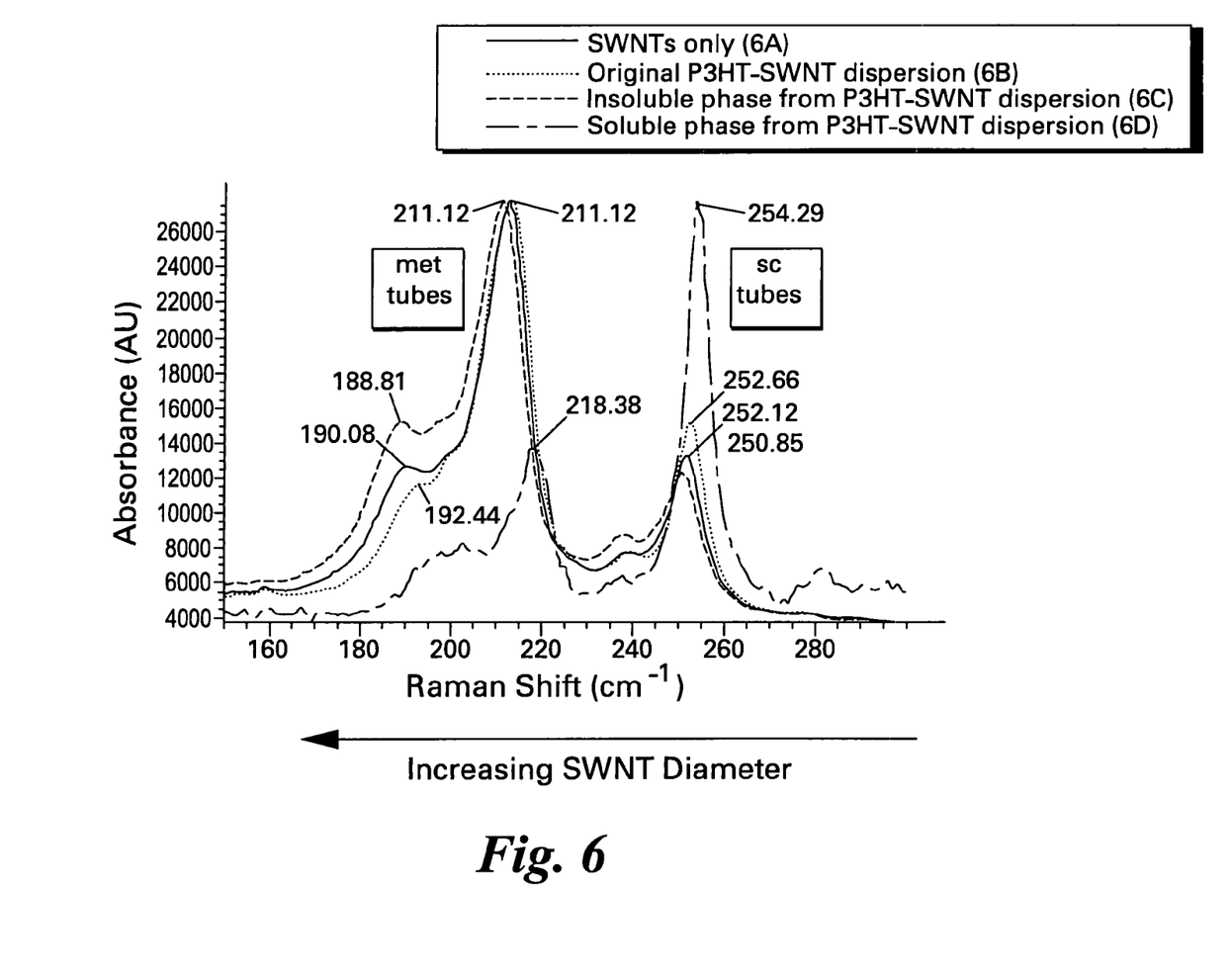
FIG. 6 shows a radial breathing mode (RBM) region 633 nm Raman spectra of SWNTs solvent-cast onto quartz from $CHCl_3$.

Raman studies using a 633 nm laser source provided further evidence for selectively dispersing semi-conducting SWNTs. FIG. 6 depicts the radial breathing mode (RBM) region of the spectra obtained. These findings strongly support selective solubilization of semi-conducting SWNTs (especially with diameters in the vicinity of 0.9 nm) and the resulting separation into an sc-enriched soluble phase and a met-enriched insoluble phase. Table III is a summary and interpretation of the RBM region of the 633 nm Raman data for polymer P3HT-SWNT dispersions solvent-cast onto quartz wafers from $CHCl_3$ solutions.

TABLE III

| RBM band ($+/-2$ cm$^{-1}$) | SWNT diameter ($+/-0.03$ nm) | Pristine SWNTs intensity | P3HT-SWNT dispersion intensity | Precipitate intensity | Supernatant intensity | Assignment |
|---|---|---|---|---|---|---|
| 190 | 1.26 | m, sh | m, sh | m, sh | — | met |
| 202 | 1.18 | m, sh | m, sh | m, sh | w | met |
| 212 | 1.12 | s | s | s | m | met |
| 218 | 1.09 | — | — | — | m | met |
| 253 | 0.93 | m | m | m | s | sc | w = weak;
m = medium;
s = strong;
sh = shoulder

Figure 7:
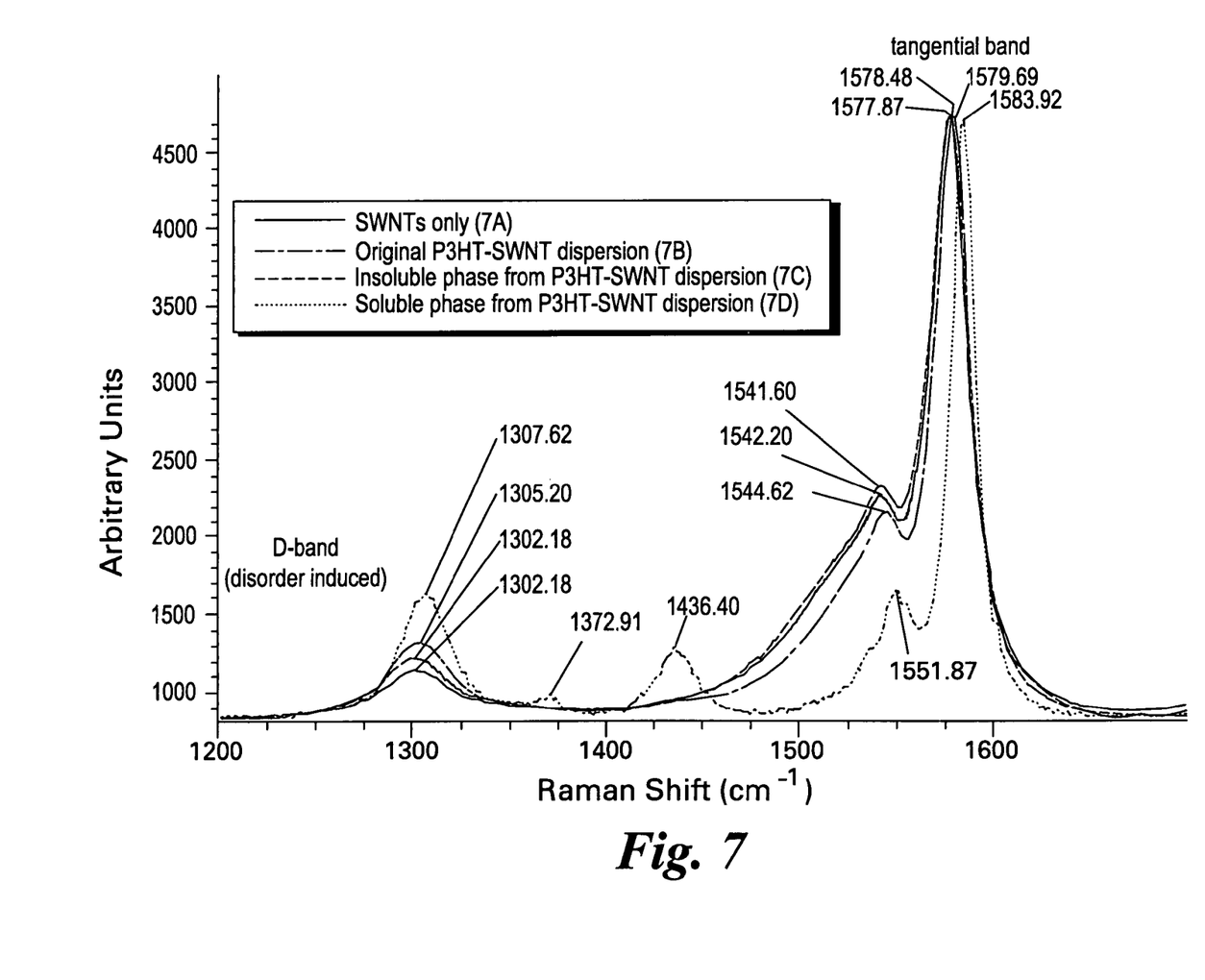
FIG. 7 shows a tangential band region 633 nm Raman spectra of SWNTs solvent-cast onto quartz from $CHCl_3$.

The tangential band region of Raman spectra obtained using a 633 nm laser source are shown in FIG. 7. These spectra provide further verification of the ability of the soluble polymer P3HT to selectively solubilize sc-SWNTs, as indicated by the significantly narrower and weaker profile of the band envelope in the 1540-1600 cm$^{-1}$ region (and the band's slight blue shift) resulting from the soluble phase (trace 7D) compared to the other three traces shown. This is consistent with the supernatant (soluble phase) having a significantly higher relative content of sc-SWNTs than any of the other three samples. Accordingly, the insoluble phase (trace 7C) has the highest met:sc SWNTs ratio. This further supports the selective solubilization of sc-SWNTs, and the resulting separation into an sc-enriched soluble phase and a met-enriched insoluble phase.

In another embodiment, at least one nanotube is dispersed by non-covalently attaching a soluble oligomer to the at least one nanotube. SWNTs are insoluble in water; however, water-soluble oligomers, such as Congo red, can be non-covalently attached to HipCO SWNTs in aqueous media and partially disperse the SWNTs. Although the SWNTs are completely insoluble in water, SWNTs disperse in the presence of Congo red, at least up to concentrations of 0.5 mg/ml.

Figure 8:
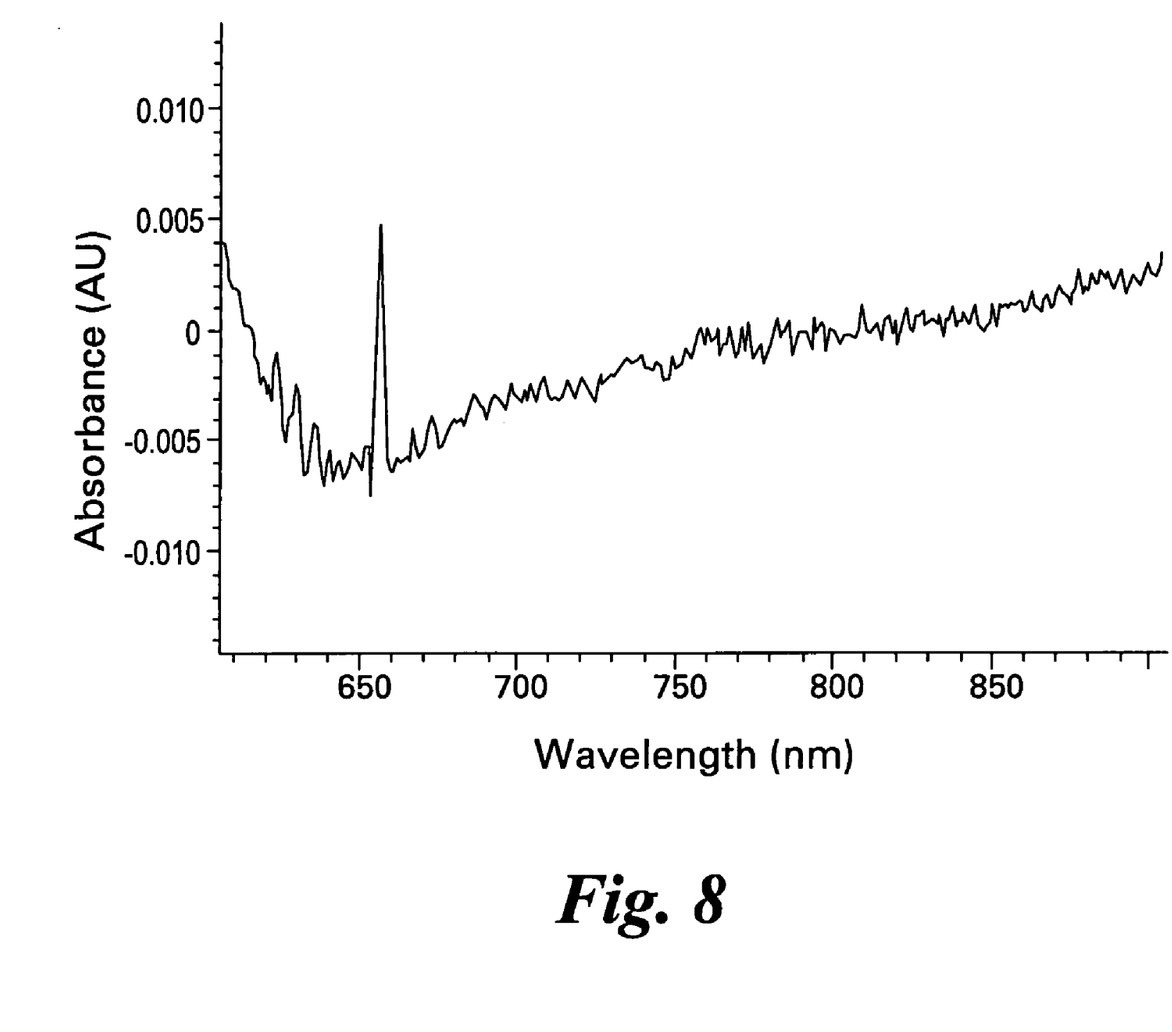
FIG. 8 is an absorption spectrum of only Congo Red in water.
Figure 9:
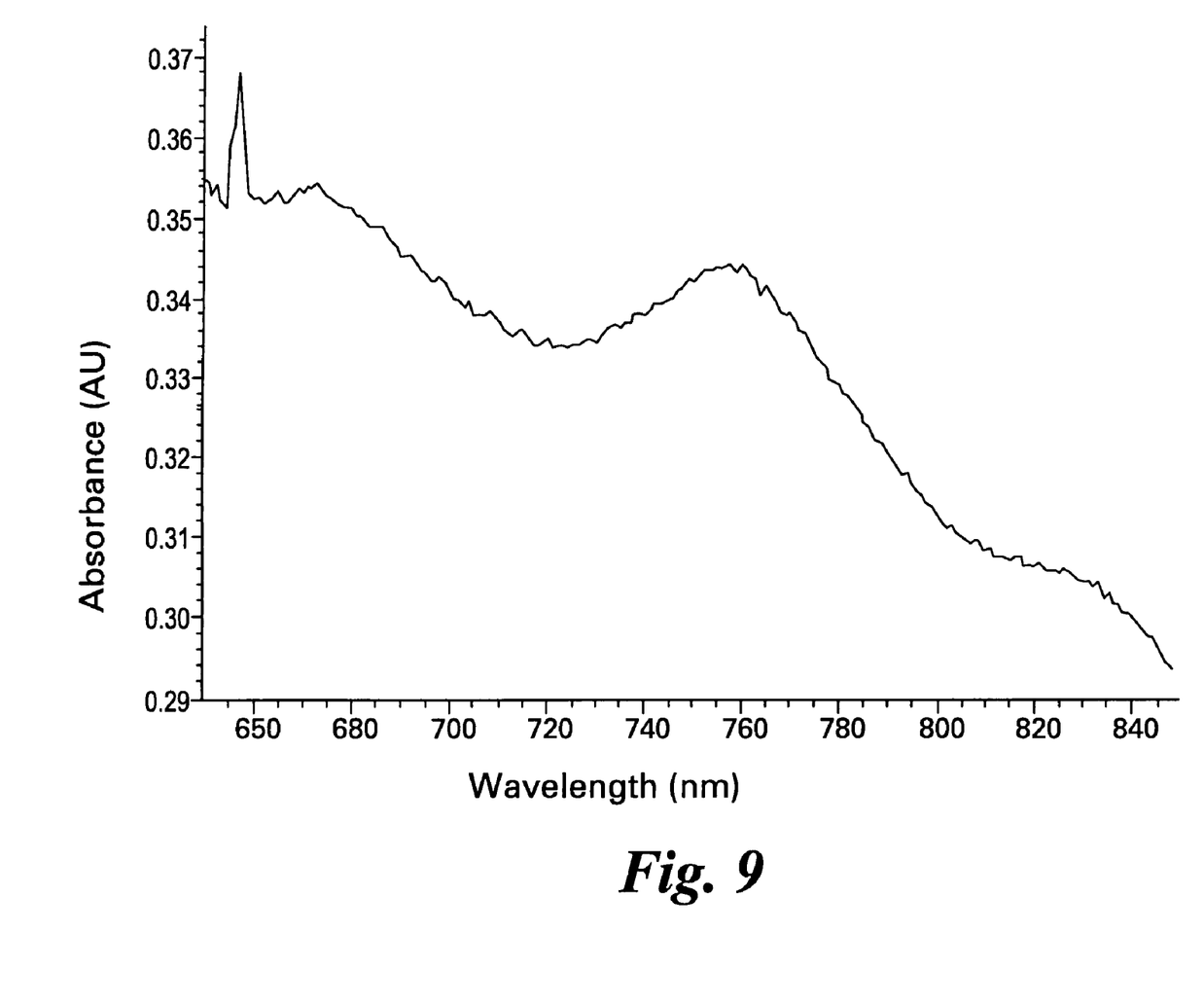
FIG. 9 is an absorption spectrum of SWNTs non-covalently attached to "Congo Red" in water.

FIG. 8 shows the absorption spectrum of only Congo red in water (0.5 mg/ml) (600-900 nm), while FIG. 9 shows the absorption spectrum in the same solvent of SWNTs (0.5 mg/ml) non-covalently attached to Congo red (640-900 nm). It is evident that new peaks (670 and 760 nm) resulting from the electronic transitions of solubilized SWNTs are present in FIG. 9. The spectrum of only untreated SWNTs in water (not included) did not show any of the SWNT peaks evident in FIG. 9, indicating no SWNT dispersion.

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

What is claimed is:

1. A nanostructure comprising:
   at least one nanotube;
   at least one chemical moiety non-covalently attached to the at least one nanotube, wherein the at least one chemical moiety is one of a soluble polymer, a soluble oligomer, and combinations thereof; wherein the at least one chemical moiety enhances dispersion of the at least one nanotube; and
   at least one dendrimer bonded to the at least one chemical moiety,
   wherein the at least one dendrimer comprises a polybenzyl ether dendrimer.

2. The nanostructure of claim 1, wherein the at least one nanotube comprises carbon.

3. The nanostructure of claim 2, wherein the at least one carbon nanotube comprises at least one of a single-walled carbon nanotube, a multi-walled carbon nanotube, and combinations thereof.

4. The nanostructure of claim 2, wherein the at least one carbon nanotube comprises at least one of a metallic carbon nanotube, a semi-metallic carbon nanotube, a semi-conducting carbon nanotube, and combinations thereof.

5. The nanostructure of claim 4, wherein the at least one, carbon nanotube comprises a semi-conducting carbon nanotube.

6. The nanostructure of claim 1, wherein electrical, mechanical, or thermal properties of the at least one nanotube non-covalently attached to the at least one chemical moiety are substantially the same as those of the at least one nanotube prior to attachment to the at least one chemical moiety.

7. The nanostructure of claim 1, wherein the at least one chemical moiety comprises a plurality of chemical moieties.

8. The nanostructure of claim 1, wherein the at least one chemical moiety is non-covalently attached to the at least one nanotube at a plurality of sites on the at least one nanotube.

9. The nanostructure of claim 1, wherein the at least one chemical moiety is non-covalently attached via at least one of ionic interaction, $\pi$-$\pi$ orbital interaction, hydrogen bonding, Van der Waals interaction, and combinations thereof.

10. The nanostructure of claim 1, wherein the at least one chemical moiety comprises a soluble polymer.

11. The nanostructure of claim 10, wherein the soluble polymer comprises a conjugated soluble polymer.

12. The nanostructure of claim 11, wherein the conjugated soluble polymer comprises at least one of a polythiophene, a polypyrrole, a polyfluorene, a polyphenylene, a polyphenylene ethynylene, a polyphenylene vinylene, a poly(alkylidene fluorene), a poly(fluorenebithiophene), and combinations thereof.

13. The nanostructure of claim 12, wherein the conjugated soluble polymer comprises a polythiophene.

14. The nanostructure of claim 13, wherein the polythiophene has a carbon chain in a range from C4 to C18.

15. The nanostructure of claim 14, wherein the polythiophene comprises poly-3-hexyl-thiophene.

16. The nanostructure of claim 12, wherein the conjugated soluble polymer comprises a polyfluorene.

17. The nanostructure of claim 16, wherein the polyfluorene has a carbon chain in a range from C4 to C18.

18. The nanostructure of claim 17, wherein the polyfluorene comprises dihexylpolyfluorene.

19. The nanostructure of claim 1, wherein the at least one dendrimer is bonded to an end group of the at least one chemical moiety.

20. A nanostructure comprising:
at least one nanotube;
at least one chemical, moiety non-covalently attached to the at least one nanotube, wherein the at least one chemical moiety is one of a soluble polymer, a soluble oligomer, and combinations thereof; wherein the at least one chemical, moiety enhances dispersion of the at least one nanotube; and
at least one dendrimer bonded to the at least one chemical moiety,
wherein the at least one chemical moiety comprises a soluble oligomer,
wherein the soluble oligomer comprises a conjugated soluble oligomer,
wherein the conjugated soluble oligomer comprises an azo dye, and
wherein the azo dye comprises 3,3'-[[1,1'-Biphenyl]4,4'-diylbis(azo)]-bis[4-amino-1-naphtalenesulfonic acid] disodium salt.

21. The nanostructure of claim 20, wherein the at least one dendrimer comprises at least one of an aliphatic ether, an aliphatic ester, an aliphatic amine, an aliphatic amide, an aromatic ether, an aromatic ester, an aromatic amine, an aromatic amide, an aromatic alkyne, a phenylene, an aromatic alkene, a polyether carbarnate, and combinations thereof.

22. A method of dispersing at least one nanotube, the method comprising the steps of:
providing at least one nanotube and at least one chemical moiety to the solvent, wherein at least one dendrimer is bonded to the at least one chemical moiety;
debundling the at least one nanotube;
non-covalently attaching the at least one chemical moiety to the at least one nanotube, wherein the at least one non-covalently attached chemical moiety disperses the at least one nanotube, and
wherein the at least one dendrimer comprises a polybenzyl ether dendrimer.

23. The method of claim 22, wherein the solvent comprises an organic solvent.

24. The method of claim 22, wherein the solvent comprises an aqueous solvent.

25. The method of claim 22, wherein the step of non-covalently attaching comprises mixing the at least one chemical moiety with the at least one nanotube in a solvent.

26. The method of claim 22, wherein the at least one nanotube comprises carbon.

27. The method of claim 26, wherein the at least one carbon nanotube comprises at least one of a single-walled carbon nanotube, a multi-walled carbon nanotube, and combinations thereof.

28. The method of claim 26, wherein the at least one carbon nanotube comprises at least one of a metallic carbon nanotube, a semi-metallic carbon nanotube, a semi-conducting carbon nanotube, and combinations thereof.

29. The method of claim 28, wherein the step of non-covalently attaching the at least one chemical moiety comprises selectively non-covalently attaching the at least one chemical moiety to the at least one semi-conducting carbon nanotube.

30. The method of claim 29, further comprising separating the at least one non-covalently attached semi-conducting carbon nanotube.

31. The method of claim 22, wherein electrical, mechanical, or thermal properties of the at least one nanotube non-covalently attached to the at least one chemical moiety are substantially the same as those of the at least one nanotube prior to attachment to the one chemical moiety.

32. The method of claim 22, wherein the step of non-covalently attaching the at least one chemical moiety to the at least one nanotube comprises attaching the at least one chemical moiety at a plurality of sites on the at least one nanotube.

33. The method of claim 22, wherein the step of non-covalently attaching the at least one chemical moiety comprises non-covalently attaching the at least ones chemical moiety via at least one of ionic interaction, π-π orbital interactions, hydrogen bonding, Van der Waals interaction, and combinations thereof.

34. The method of claim 22, wherein the at least one chemical moiety comprises a soluble polymer.

35. The method of claim 34, wherein the soluble polymer comprises a conjugated soluble polymer.

36. The method of claim 35, wherein the conjugated soluble polymer comprises at least one of a polythiophene, a polypyrrole, a polyfluorene, a polyphenylene, a polyphenylene ethynylene, a polyphenylene vinylene, a poly(alkylidene fluorene), a poly(fluorenebithiophene), and combinations thereof.

37. The method of claim 36, wherein the conjugated soluble polymer comprises a polythiophene.

38. The method claim 37, wherein the polythiophene has a carbon chain in a range from C4 to C18.

39. The method of claim 38, wherein the polythiophene comprises poly-3-hexyl-thiophene.

40. The method of claim 36, wherein the conjugated soluble polymer comprises a polyfluorene.

41. The method of claim 40, wherein the polyfluorene has a carbon chain in a range from C4 to C18.

42. The method of claim 41, wherein the polyfluorene comprises dihexylpolyfluorene.

43. The method of claim 34, wherein the soluble polymer comprises a polyphenylene oxide.

44. The method of claim 22, wherein the at least one dendrimer is bonded to an end group of the at least one chemical moiety.

45. A method of dispersing at least one nanotube, the method comprising the steps of:
providing at least one nanotube and at least one chemical moiety to the solvent, wherein at least one dendrimer is bonded to the at least one chemical moiety;
debundling the at least one nanotube;
non-covalently attaching the at least one chemical moiety to the at least one nanotube, wherein the at least one non-covalently attached chemical moiety disperses the at least one nanotube,
wherein the at least one chemical moiety comprises a soluble oligomer,
wherein the soluble oligomer comprises a conjugated soluble oligomer,
wherein the conjugated soluble oligomer comprises an azo dye, and
wherein the azo dye comprises 3,3'-[[1,1'-Biphenyl]-4,4'-diylbis(azo)]-bis[4-amino-1-naphtalenesulfonic acid] disodium salt.

46. The method of claim 45, wherein the at least one dendrimer comprises at least one of an aliphatic ether, an aliphatic ester, an aliphatic amine, an aliphatic amide, an aromatic ether, an aromatic ester, an aromatic amine, an aromatic amide, an aromatic alkyne, a phenylene, an aromatic alkene, a polyether carbamate, and combinations thereof.

47. A nanostructure comprising:
a) at least one semi-conducting carbon nanotube;
b) at least one conjugated soluble polymer non-covalently attached to the at least one semi-conducting carbon nanotube, wherein the at least one conjugated soluble polymer enhances dispersion of the at least one semi-conducting carbon nanotube; and wherein the at least one conjugated soluble polymer comprises at least one of a polythiophene, a polyfluorene and combinations thereof; and
c) at least one dendrimer bonded to the at least one conjugated soluble polymer, and
wherein the at least one dendrimer comprises a polybenzyl ether dendrimer.

48. The nanostructure of claim 47, wherein the at least one semi-conducting carbon nanotube comprises at least one of a single-walled carbon nanotube, a multi-walled carbon nanotube, and combinations thereof.

49. The nanostructure of claim 47, wherein electrical, mechanical, or thermal properties of the at least one semi-conducting carbon nanotube non-covalently attached to the at least one conjugated soluble polymer are substantially the same as those of the at least one semi-conducting carbon nanotube prior to attachment to the at least one conjugated soluble polymer.

50. The nanostructure of claim 47, wherein the at least one conjugated soluble polymer is non-covalently attached to the at least one semi-conducting carbon nanotube at a plurality of sites on the at least one semi-conducting carbon nanotube.

51. The nanostructure of claim. 47, wherein the at least one conjugated soluble polymer is non-covalently attached via at least one of ionic interaction, π-π orbital interactions, hydrogen bonding, Van der Waals interaction, and combinations thereof.

52. The nanostructure of claim 47, wherein the at least one conjugated soluble polymer further comprises at least one of a polypyrrole, a polyphenylene, a polyphenylene ethynylene, a polyphenylene vinylene, a poly(alkylidene fluorene). a poly(fluorenebithiophene), and combinations thereof.

53. The nanostructure of claim 47, wherein the at least one conjugated soluble polymer comprises a polythiophene.

54. The nanostructure of claim 53, wherein the polythiophene has a carbon chain in a range from C4 to C18.

55. The nanostructure of claim 54, wherein the polythiophene comprises poly-3-hexyl-thiophene.

56. The nanostructure of claim 47, wherein the at least one conjugated soluble polymer comprises a polyfluorene.

57. The nanostructure of claim 56, wherein the polythiophene has a carbon chain in a range from C4 to C18.

58. The nanostructure of claim 57, wherein the polyfluorene comprises dihexylpolyfluorene.

59. The nanostructure of claim 47, wherein the at least one dendrimer comprises at least one of an aliphatic ether, an aliphatic ester, an aliphatic amine, an aliphatic amide, an aromatic ether, an aromatic ester, an aromatic amine, an aromatic amide, an aromatic alkyne, a phenylene, an aromatic alkene, a polyether carbamate, and combinations thereof.

60. The nanostructure of claim 47, wherein the at least one dendrimer is bonded to an end group of the at least one conjugated soluble polymer.

61. A method of selectively separating at least one semi-conducting carbon nanotube, the method, comprising the steps of:
providing a plurality of carbon nanotubes and at least one conjugated soluble polymer to a solvent, wherein at least a portion of the carbon nanotubes is semi-conducting;
debundling at least a portion of the plurality of carbon nanotubes;
non-covalently attaching the at least one conjugated soluble polymer to at least one semi-conducting carbon nanotubes, wherein the at least one non-covalently attached conjugated soluble polymer disperses the at least one semi-conducting carbon nanotube; and
separating the at least one semi-conducting carbon nanotube non-covalently attached to the at least one conjugated soluble polymer, and
wherein the at least one conjugated soluble polymer comprises at least one of a polythiophene a polyfluorene and combinations thereof, wherein the polyfluorene has a carbon chain in a range from C4 to C18, wherein the polyfluorene comprises dihexylpolyfluorene, wherein the at least one conjugated soluble polymer comprises a polyfluorene, and wherein the at least one dendrimer comprises a polybenzyl ether dendrimer.

62. The method of claim 61, wherein the step of non-covalently attaching comprises mixing the at least one conjugated soluble polymer with the at least semi-conducting carbon nanotube in the solvent.

63. The method of claim 61, wherein the solvent comprises an organic solvent.

64. The method of claim 61, wherein the solvent comprises an aqueous solvent.

65. The method of claim 61, wherein the at least one semi-conducting carbon nanotube comprises at least one of a single-walled carbon nanotube, a multi-walled carbon nanotube, and combinations thereof.

66. The method of claim 61, wherein electrical, mechanical, or thermal properties of the at least one at least one semi-conducting carbon nanotube non-covalently attached to the at least one conjugated soluble polymer are substantially the same as those of the at least one semi-conducting carbon nanotube prior to attachment to the at least one conjugated soluble polymer.

67. The method of claim 61, wherein the step of non-covalently attaching the at least one conjugated soluble polymer comprises attaching the at least one conjugated soluble polymer at a plurality of sites on the at least one semi-conducting nanotube.

68. The method of claim 61, wherein the polythiophene has a carbon chain in a range from C4 to C18.

69. The method of claim 68, wherein the polythiophene comprises poly-3-hexyl-thiophene.

70. The method of claim 61, wherein at least one dendrimer is bonded to the at least one conjugated soluble polymer.

71. The method of claim 61, wherein at least one dendrimer is bonded to an end group of the at least one conjugated soluble polymer.

72. The method of claim 61, wherein the step of separating comprises at least one of centrifugation, filtration, magnetic field induced separation, chromatography, electrophoresis, and combinations thereof.

* * * * *